(No Model.)
T. C. HARRIS.
NUT LOCK.
No. 426,270. Patented Apr. 22, 1890.
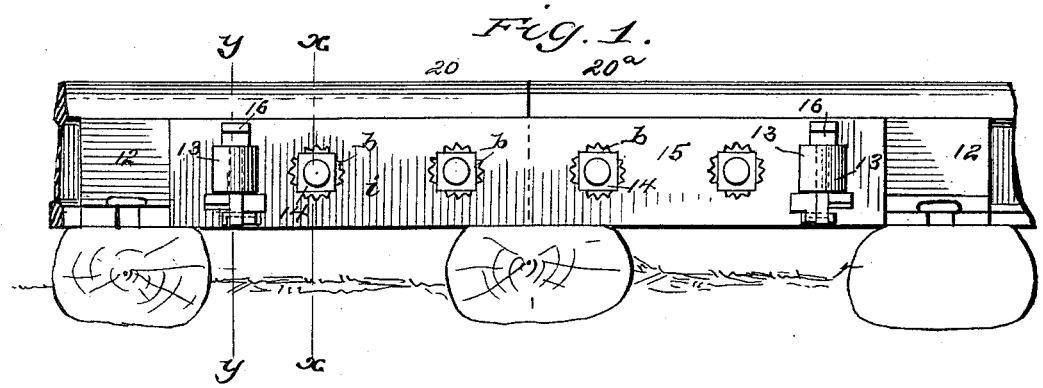
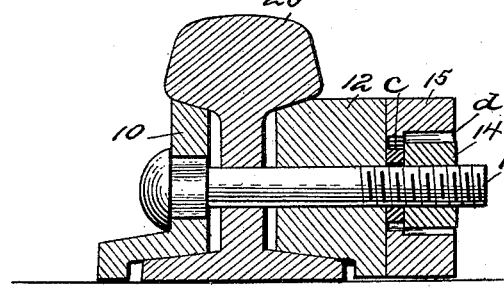 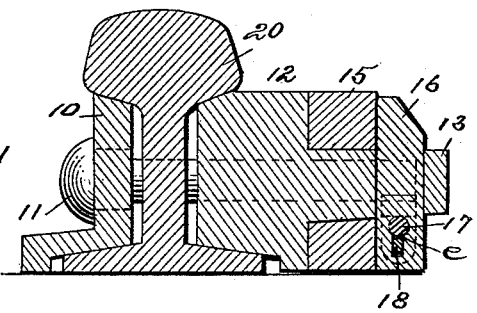
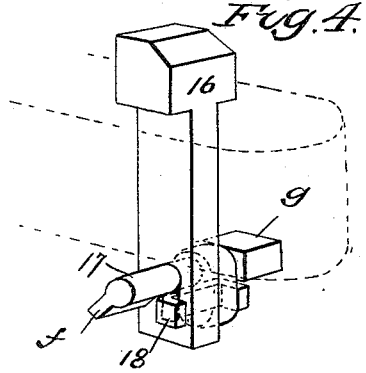 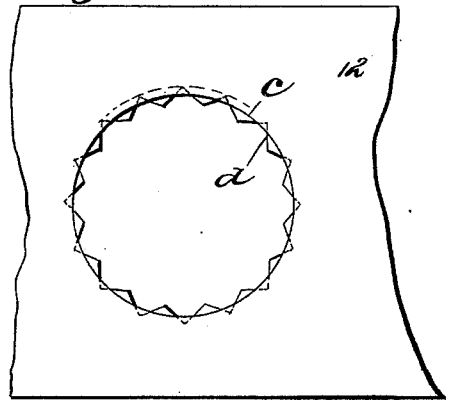
WITNESSES:
W. R. Davis.
C. Sedgwick
INVENTOR:
T. C. Harris
BY Munn &Co.
ATTORNEYS.

UNITED STATES PATENT OFFICE.

THOMAS CARLYLE HARRIS, OF PLEASANT GROVE, MINNESOTA.

NUT-LOCK.

SPECIFICATION forming part of Letters Patent No. 426,270, dated April 22, 1890.

Application filed August 13, 1889. Serial No. 320,562. (No model.)

*To all whom it may concern:*

Be it known that I, THOMAS CARLYLE HARRIS, of Pleasant Grove, in the county of Olmsted and State of Minnesota, have invented a new and Improved Nut-Lock, of which the following is a full, clear, and exact description.

This invention relates to nut-locks, the object of the invention being to provide against all possible accidental displacement of the burrs or nuts employed in connection with a rail-joint.

To the ends above named the invention consists, essentially, of certain novel constructions, arrangements, and combinations of elements, to be hereinafter fully described, and specifically pointed out in the claims.

Reference is to be had to the accompanying drawings, forming a part of this specification, in which similar figures and letters of reference indicate corresponding parts in all the views.

Figure 1 is a side view of a rail-joint, representing the same as it appears when constructed to embody my improved nut-lock. Fig. 2 is a cross-sectional view on line $x\ x$ of Fig. 1. Fig. 3 is a cross-sectional view on line $y\ y$ of Fig. 1. Fig. 4 is an enlarged perspective view of the keys employed in connection with my lock, and Fig. 5 is an enlarged view of a portion of the lock proper.

In the drawings, 10 represents an inner fish-plate of ordinary construction, through which the shanks of the bolts 11 are passed. Upon the outer side of the rails there is placed a strip 12, formed with two or more outwardly-extending tenons 13 and with a series of apertures adapted to receive the shanks of the bolts 11. After the bolts 11 have passed through the fish-plate 10, the webs of the rails to be connected, (which rails are shown at 20 and 20ᵃ,) and the bores of the strip 12, they are engaged by nuts 14, and in order that these nuts may be held from turning I provide a locking-plate 15, that is formed with as many apertures $b$ as there are bolts, the inner portions of said apertures being circular and the outer sections being of star form, eight or more points (or any multiple of four) being arranged in regular star series. The ends of this locking-plate 15 are apertured to receive the tenons 13, the arrangement being such that after the nuts 14 have been turned approximately home the locking-plate may be adjusted to position upon the tenons and the outer portions of the nuts adjusted so that they will rest within the inner circular sections of the locking-plate apertures, the defining-wall of said inner circular section of such apertures being shown at $c$ in Figs. 2 and 5.

After the parts have been adjusted as above described the nuts 14 are turned so that they will be brought into register with any set or series of recesses of the outer sections $d$ of the locking-plate, this adjustment of the nuts being secured by inserting a wrench between the plate and the strip 12, any proper means being employed to space the said plate and strip. After the nuts have been properly adjusted the locking-plate is shifted again to the position in which it is shown in the drawings, and the main keys 16 are passed downward through apertures formed in the ends of the tenons 13 to hold the locking-plate to place; and in order that the keys 16 may be held from displacement I aperture their lower ends, such apertures being in the form of key-hole slots $e$, as shown best in Fig. 3, and through said key-hole slots I pass auxiliary keys 17, having wards $f$ and heads $g$, the heads being rectangular by preference. Then through the vertical section of the key-hole slot $e$, I pass a keeper 18, the ends of the keeper being bent over, as shown in Fig. 4, thus preventing the turning of the key 17. In this way I obtain an exceedingly secure lock.

Any proper arrangement for spiking the plates to the ties may be employed, and I desire it to be distinctly understood that although I have illustrated a construction adapted for use in connection with a joint which extends over three ties, still under certain circumstances the block might be shortened up so as to be used in connection with a joint which extends over two ties, in which latter case I would prefer that the tenons 13 should extend outward from points within the outer bolts—that is, from points such as those marked $i$ in Fig. 1.

Having thus described my invention, I claim as new and desire to secure by Letters Patent—

1. In a nut-lock, the locking-plate 15, formed with a series of longitudinally-aligned apertures, the inner ends $c$ of which are round and the outer ends $d$ angular, substantially as set forth.

2. In a nut-lock, the plate 12, having bolt-apertures and tenons or lugs 13, and the locking-plate 15, apertured to receive said tenons or lugs and formed with apertures registering with the bolt-apertures, and having their inner ends $c$ circular and their outer or nut-receiving portions $d$ angular, and fastenings for securing the plate 15 on the said tenons or lugs, substantially as set forth.

3. In a nut-lock, the combination, with the inner fish-plate, of an apertured and tenoned strip 12, a locking strip or plate 15, formed with apertures adapted to receive the bolts and nuts, such apertures being formed with star-shaped sections $d$ and circular sections $c$, keys 16, which pass through apertures formed in the tenoned ends, and auxiliary keys 17, which engage the keys 16, substantially as described.

4. In a nut-lock, the combination, with a tenoned strip 12, of a locking-plate apertured to receive said tenons, keys 16, which pass through apertures formed in the tenons, and auxiliary keys 17, formed with wards $f$ and keepers 18, substantially as described.

THOMAS CARLYLE HARRIS.

Witnesses:
H. A. ECKHOLDT,
THOMAS FRASER.